US012153879B2

(12) United States Patent
Daly et al.

(10) Patent No.: US 12,153,879 B2
(45) Date of Patent: Nov. 26, 2024

(54) SYNTACTIC AND SEMANTIC AUTOCORRECT LEARNING

(71) Applicant: INTERNATIONAL BUSINESS MACHINES CORPORATION, Armonk, NY (US)

(72) Inventors: Elizabeth Daly, Dublin (IE); Oznur Alkan, Clonsilla (IE); Anup Kalia, White Plains, NY (US); Jin Xiao, White Plains, NY (US); Bei Chen, Blanchardstown (IE); Rahul Nair, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/659,823

(22) Filed: Apr. 19, 2022

(65) Prior Publication Data

US 2023/0334241 A1   Oct. 19, 2023

(51) Int. Cl.
*G06F 40/166* (2020.01)
*G06F 16/335* (2019.01)
*G06F 40/211* (2020.01)
*G06F 40/232* (2020.01)
*G06N 5/022* (2023.01)

(52) U.S. Cl.
CPC .......... *G06F 40/232* (2020.01); *G06F 16/337* (2019.01); *G06F 40/166* (2020.01); *G06F 40/211* (2020.01); *G06N 5/022* (2013.01)

(58) Field of Classification Search
CPC .... G06F 40/232; G06F 16/337; G06F 40/166; G06F 40/211

(Continued)

(56) References Cited

U.S. PATENT DOCUMENTS 8,176,419 B2   5/2012 Zhu et al.
8,930,350 B1   1/2015 Herscovici et al.
(Continued)

FOREIGN PATENT DOCUMENTS

AU   2013271849 A1   12/2014
CN   113778875 A  * 12/2021  .......... G06F 11/3676
(Continued)

OTHER PUBLICATIONS

A Review of the Trends and Challenges in Adopting Natural Language Processing Methods for Education Feedback Analysis by Shaik (Year: 2022).*

(Continued)

*Primary Examiner* — Bharatkumar S Shah
(74) *Attorney, Agent, or Firm* — James L. Olsen

(57) ABSTRACT

Learning and correcting errors in text input fields to an artificial intelligence (AI) system includes receiving, by the AI system from a target system, an input text. The AI system executes a text processing operation on the input text by applying at least one transformer from a library of transformers to the input text to generate transformed text. At least one proposed correction to the input text is output by the AI system based on an analysis of the transformed text. Feedback data, associated with the at least one proposed correction, is then received from a user of the target system to iteratively learn, by the AI system, which of the transformers need be applied on future input text to accurately generate future proposed corrections on the future input text.

20 Claims, 6 Drawing Sheets

(58) Field of Classification Search
USPC .......................................................... 704/500
See application file for complete search history.

(56) References Cited

U.S. PATENT DOCUMENTS

| | | | |
|---|---|---|---|
| 9,747,272 B2 | 8/2017 | Ouyang et al. | |
| 9,767,093 B2* | 9/2017 | Tremblay | G06F 40/205 |
| 9,977,779 B2 | 5/2018 | Winer | |
| 11,010,550 B2* | 5/2021 | Bellegarda | G06N 3/045 |
| 11,749,275 B2* | 9/2023 | Walker, II | G10L 15/22 |
| | | | 704/257 |
| 11,900,936 B2* | 2/2024 | Lindahl | G10L 21/06 |
| 2012/0296638 A1* | 11/2012 | Patwa | G06F 16/367 |
| | | | 704/E15.001 |
| 2014/0350987 A1* | 11/2014 | Kapoor | G09B 7/02 |
| | | | 705/7.19 |
| 2015/0113072 A1 | 4/2015 | Chan et al. | |
| 2016/0103813 A1 | 4/2016 | Liensberger | |
| 2016/0162800 A1* | 6/2016 | Qin | G06N 20/00 |
| | | | 706/12 |
| 2016/0179937 A1* | 6/2016 | Allen | G06F 16/3329 |
| | | | 707/728 |
| 2017/0091168 A1* | 3/2017 | Bellegarda | G06N 5/022 |
| 2020/0312317 A1* | 10/2020 | Kothari | G06F 3/167 |
| 2021/0019373 A1* | 1/2021 | Freitag | G10L 13/00 |
| 2021/0082408 A1* | 3/2021 | Shechtman | G10L 15/16 |
| 2021/0097424 A1* | 4/2021 | Kang | G06Q 10/1053 |
| 2021/0176300 A1* | 6/2021 | Balasubramanian | H04L 65/61 |
| 2021/0319321 A1* | 10/2021 | Krishnamurthy | G06N 20/00 |
| 2022/0198325 A1* | 6/2022 | Fowe | G08G 1/0112 |
| 2022/0215183 A1* | 7/2022 | Freitag | G10L 13/00 |

FOREIGN PATENT DOCUMENTS

| | | | | |
|---|---|---|---|---|
| KR | 20220067371 A | * | 5/2022 | G06F 40/51 |
| WO | 2000038041 A1 | | 6/2000 | |

OTHER PUBLICATIONS

A Review of the Trends and Challenges in Adopting Natural Language Processing Methods for Education Feedback Analysis by Shaik (Year: 2022) (Year: 2022).*

T. Shaik et al., "A Review of the Trends and Challenges in Adopting Natural Language Processing Methods for Education Feedback Analysis," in IEEE Access, vol. 10, pp. 56720-56739, 2022, doi: 10.1109/ACCESS.2022.3177752. keywords: {Artificial intelligence; Education; Feature extraction; Natural language (Year: 2022).*

Luchomoomun t al., . "A knowledge based system for automated assessment of short structured questions." 2019 IEEE Global Engineering Education Conference (EDUCON). IEEE, 2019, DOI: 10.1109/EDUCON.2019.8725139 (4 pages).

Li et al. "Sentence similarity based on semantic nets and corpus statistics." IEEE transactions on knowledge and data engineering 18.8 (2006): 1138-1150. https://doi.org/10.1109/TKDE.2006.130 (13 pages).

Atkinson-Abutndy, John, Chris Mellish, and Stuart Aitken. "Combining information extraction with genetic algorithms for text mining." IEEE Intelligent Systems 19.3 (2004): 22-30, DOI: 10.1109/MIS.2004.4 (9 pages).

Basu et al. "Using lexical knowledge to evaluate the novelty of rules mined from text." Proceedings of the NAACL workshop and other Lexical Resources: Applications, Extensions and Customizations. 2001. (6 pages).

Chen et al., . "A patent document retrieval system addressing both semantic and syntactic properties." Proceedings of the ACL-2003 workshop on Patent corpus processing. 2003 https://doi.org/10.3115/1119303.1119304 (6 pages).

Kukich, Techniques For Automatically Correcting Words In Text, ACM Computing Surveys (CSUR), Dec. 1, 1992, vol. 24, Issue 4, 377-439 pp.

Li et al. "A Contextual-Bandit Approach to Personalized News Article Recommendation." arXiv preprint arXiv:1003.0146, Mar. 1, 2010. 10 pages.

Lu et al. "Contextual multi-armed bandits." Proceedings of the Thirteenth international conference on Artificial Intelligence and Statistics. JMLR Workshop and Conference Proceedings, 2010. 8 pages.

Unknown, "Autocorrecting user input", IBM Cloud, Last updated: May 14, 2024, 7 pages, https://cloud.ibm.com/docs/watson-assistant?topic=watson-assistant-autocorrection.

* cited by examiner

SYNTACTIC AND SEMANTIC AUTOCORRECT LEARNING

BACKGROUND OF THE INVENTION

Field of the Invention

The present invention relates in general to computing systems, and more particularly, to various embodiments providing text processing to learn sensitivities and corrections for text as inputs to artificial intelligence (AI) systems.

Description of the Related Art

Autocorrect technologies provide replacement words for user inputted text when the user inputted text does not match a word in a word corpus at the computer device in which the user is inputting text. For example, an autocorrect program may perform an auto spell check to automatically correct the spelling of user input text based on a corpus of recognized words in a language. The autocorrect program may also determine words at an edit distance from the user input text and then determine a probability value or relevancy score for the determined words within the edit distance indicating the likelihood the word within the edit distance is the correct word for the user input text.

SUMMARY OF THE INVENTION

Various computer-implemented embodiments for learning and correcting errors in text input fields to an artificial intelligence (AI) system are provided. In a first step, the AI receives an input text transmitted from a target system. The AI system executes a text processing operation on the input text by applying at least one transformer from a library of transformers to the input text to generate transformed text. At least one proposed correction to the input text is output by the AI system based on an analysis of the transformed text. Feedback data, associated with the at least one proposed correction, is then received from a user of the target system to iteratively learn, by the AI system, which of the transformers need be applied on future input text to accurately generate future proposed corrections on the future input text.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
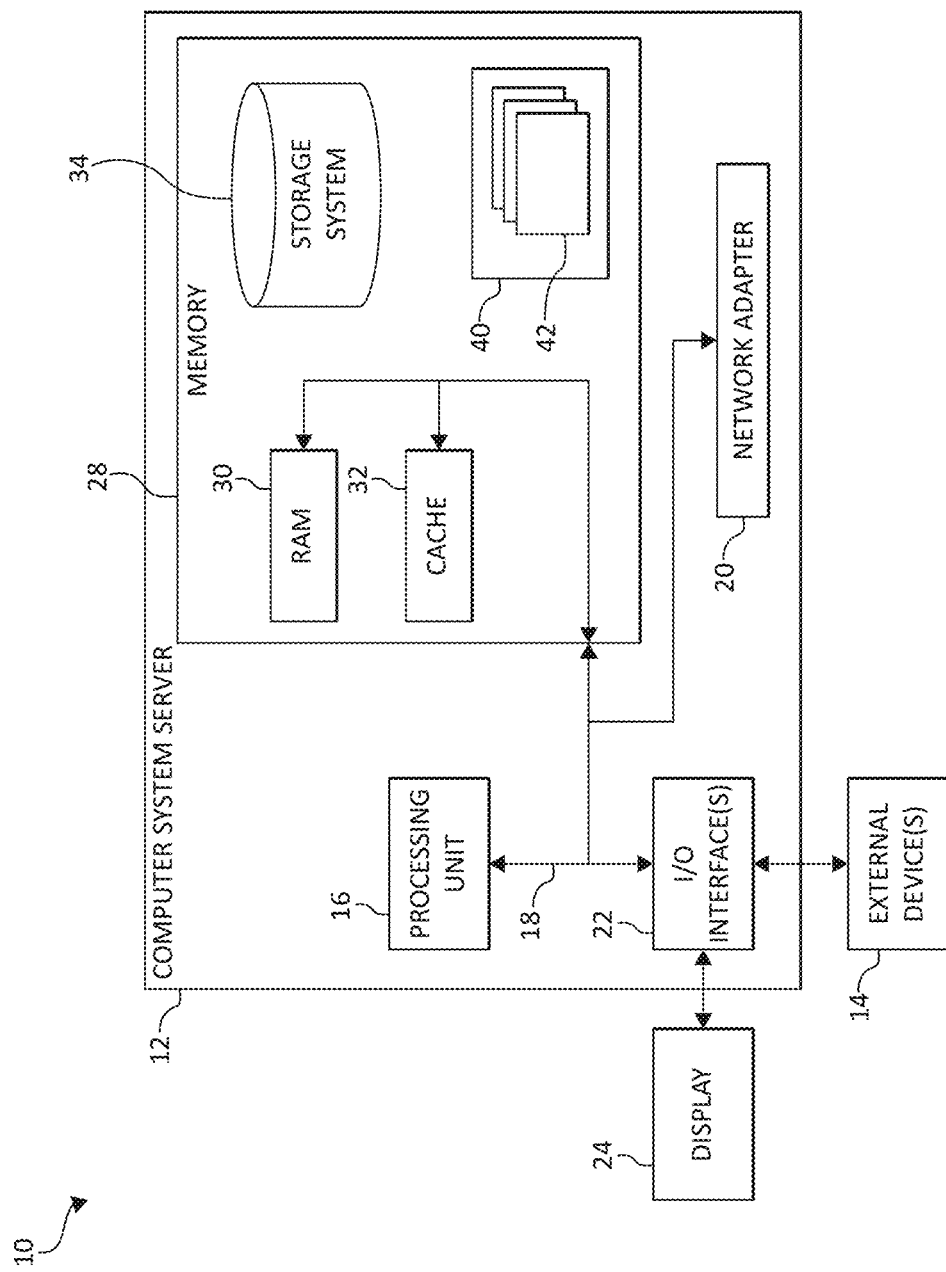
FIG. 1 is a block diagram depicting an exemplary computing node, according to an embodiment of the present invention.

As discussed above, autocorrect technologies provide replacement words for user inputted text when the user inputted text does not match a word in a word corpus at the computer device in which the user is inputting text. For example, an autocorrect program may perform an auto spell check to automatically correct the spelling of user input text based on a corpus of recognized words in a language. The autocorrect program may also determine words at an edit distance from the user input text and then determine a probability value or relevancy score for the determined words within the edit distance indicating the likelihood the word within the edit distance is the correct word for the user input text.

However, challenges continue to exist when performing autocorrect functions to text in applications, and particularly, in predefined text fields in the applications to which the user inputs text. Text-based inputs into AI solutions may have many different and varying constraints (e.g., requiring all lower case characters, only well-formed entities, a list correctly delineated by commas or semicolons), according to the application in which the text field belongs to. For example, each application (i.e., computer program), according to its respective text-based fields, tends to make customized decisions at the application-level making reusable interactions with other applications or systems difficult. That is, information associated with autocorrect functions learned by a first application often does not carry over or translate to a second, different application used by the user. Rather, commonly these constraints are returned to the user in the form of an error message after the user inputs text.

For example, consider a fillable form in an application that requires basic information of the user, such as, the user's first and last name, email address, and phone number. One constraint may be, in the email field requiring text input, that an address sign (i.e., "@" symbol) be included in the text. Another constraint may be that the email field also requires a domain ending such as .com, .net, and the like. In a further example, the fillable form may also request the user enter a password having unique constraints, which must consist of uppercase and lowercase characters, numbers, or some combination thereof to be included in the input text. As noted above, failure to comply with these constraints when inputting text (or autocorrecting input text) may lead to an error message with an explanation of what triggered the error, or even an error message with no explanation for the invalid input.

The mechanisms of the present invention, therefore, improve upon the art of autocorrect technologies by treating the text-based autocorrect solution of the AI as a black box, or in other words, a system viewed in terms of its inputs and outputs but for which no internal knowledge of its internal workings are user-defined. This solution instead may be viewed as a learning system which performs AI simulations, machine learning, and/or neural networking-type functions to learn the sensitivities and corrections for text as inputs to the AI system.

To perform these functionalities, the syntactic and semantic autocorrect learning system described herein uses AI to employ a library of transformations which are available to try on sample input text to then observe the sensitivities and constraints required by the given application/text field. These transformations may include, without limitation, transforming lower case text to capitalized text (or upper case text to lower case text), spell checking, entity validation, generating and/or disambiguating acronyms, inserting or deleting commas and/or semicolons between words or items, adding and/or deleting terms, characters, and/or symbols, and the like.

It should be noted that the following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two (i.e., two, three, four, five, etc.). The term "connection" may include both an indirect "connection" and a direct "connection."

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

It should further be noted that data is increasingly processed through a variety of geographically disbursed computing components, where, for example, a local node may contain a set of data processing components yet remain in remote communication with other portions of the distributed data processing system. To with, autocorrect data may not be locally stored or processed on the user's local computer, but is instead hosted and/or processed by one or more distributed storage components that are in remote communication with the local computer. This type of data storage may, in some cases, be referred to as "cloud," or "cloud-based" storage.

Accordingly, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as local computing environments and cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
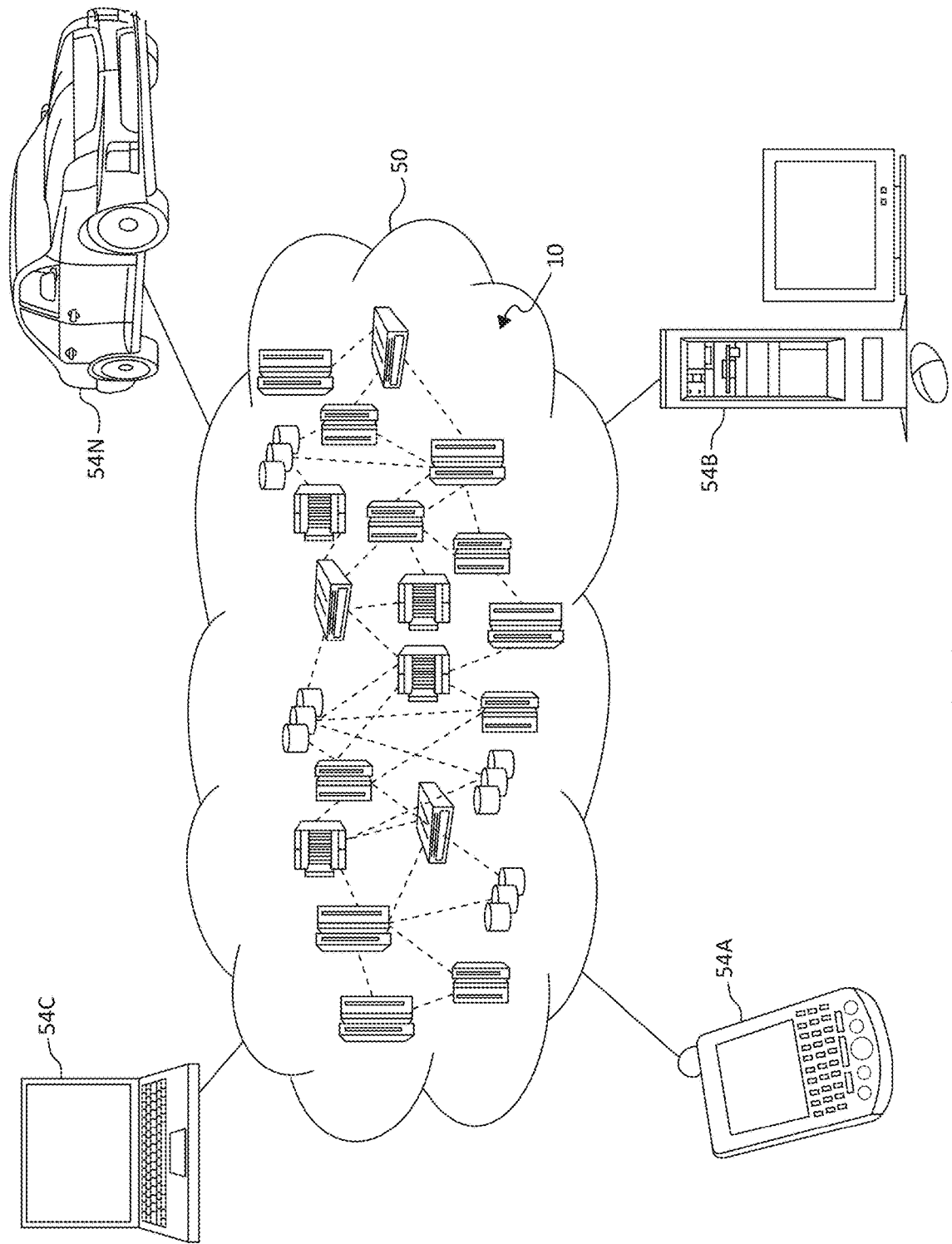
FIG. 2 is a block diagram depicting an exemplary cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
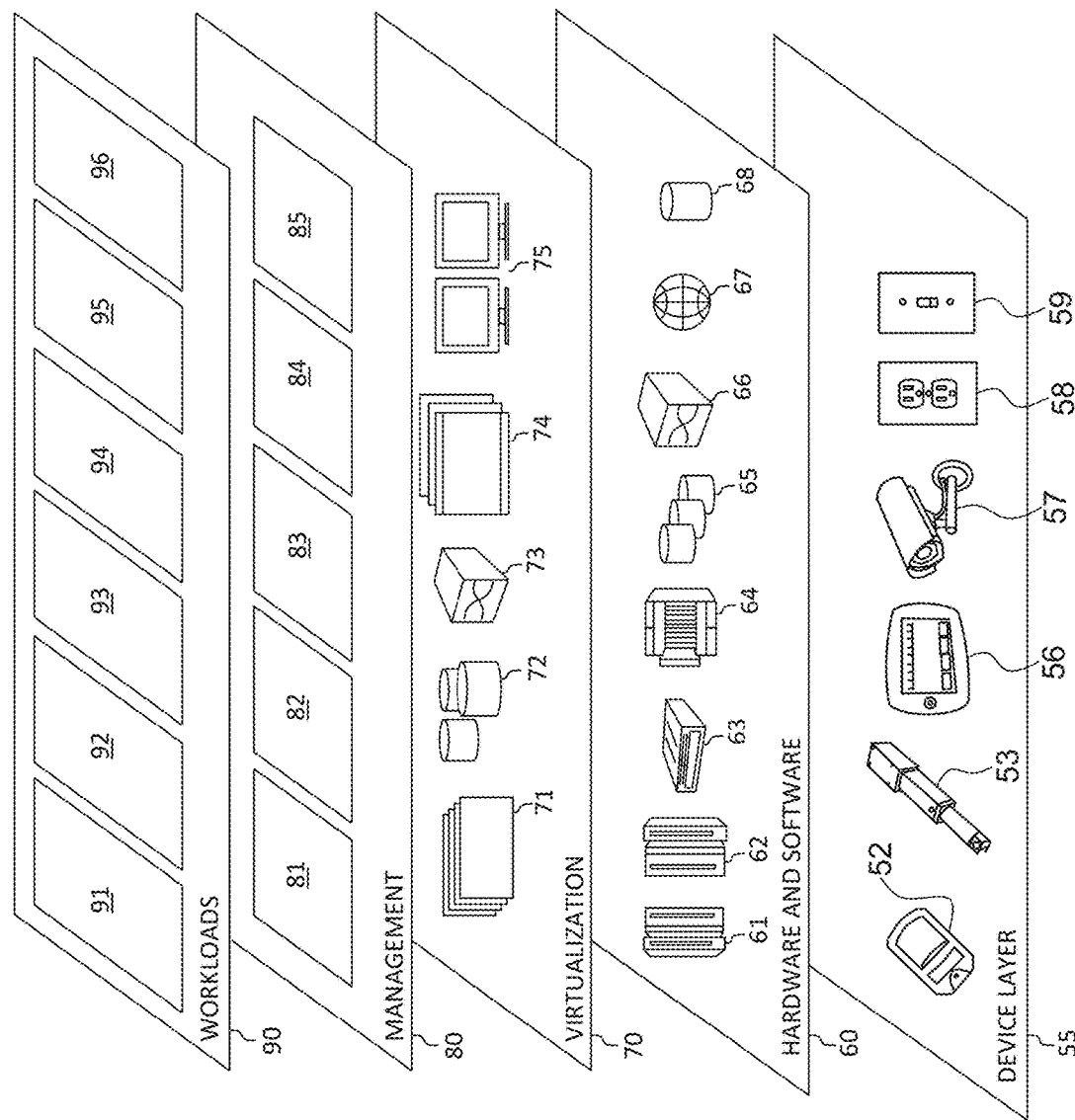
FIG. 3 is a block diagram depicting abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for performing text processing functions for autocorrect learning, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in the embodiments described herein, the mechanisms of the present invention use AI to employ a library of transformations which are available to try on sample input text to then observe the sensitivities and constraints required by the given application/text field (i.e., text entered by a user by means of an input device, such as a keyboard, into a user interface of a program). These transformations may be individually tested on the input text in sequence such that the system iteratively learns over time which transformations to apply to future text to achieve an accurate result, based on result and feedback data.

In one use-case example, consider a user who receives an email from their employer which has instructions as to how to redeem a gift or bonus given to them (e.g., inclusive of a code to enter into a website to redeem a Christmas gift). Within the body of the email, the employer may provide a typed instruction to use the redemption code "Thankyou2020" to access their gift, yet in a graphic in the body of the email instructs the user to redeem the gift using the code "THANKYOU2020". The autocorrect learning system described herein may, when inputting the redemption code Thankyou2020 in the text of the input field to access the gift, identify that the input code returns an error and recognize this code as the password from the graphic of the email. The system may then use an upper case transformer to correct the code to read THANKYOU2020, which enables the user to access the gift.

In another example, assume a user is searching for a book, at which the user types into the input field of the application to enter text "Alice in Wondreland". The autocorrect learning system may try using a lower case transformer to change all terms of the text to lower case, with no impact. The system may then use a spell check transformer to determine that "wondreland" is spelled incorrectly, and should read "wonderland", and return this result to the user.

In a further example, assume the user is searching for the book, where multiple fields exist in the input text. This may include inputting text for the title of the book as "Alice in Wondreland" and text for the author as "Lewis Carroll". While the autocorrect learning system may determine, via performing transformations using a sequence of transformers, that the constraints for the text input are case insensitive and that the spelling of "wondreland" is incorrect (and correct the typographical error), the application in which the text is input may continue to generate an error based on similar words. The autocorrect learning system may use this information to conclude that a constraint of the input is that the text must refer to a well-formed entity, and absent any dictionary information with which to compare, the system may at least identify those constraints of which the text is not dependent on.

In a final example, a user may enter into a text field of an application the acronym "j s", which upon querying a knowledge graph, the autocorrect learning system may use an acronym transformer to determine the user is likely referring to JavaScript™. Similarly, the knowledge graph may be queried to identify that an input term of "react" is likely being referred to as the JavaScript™ React library, or an input term of "j s react" is being referred to as the same. In each case, the autocorrect learning system may return the proposed correction(s) to the user, or simply correct the input text automatically.

This functionality, as presented herein, lends itself to many use cases. In one instance, the autocorrect learning system may use its learned knowledge of constraints and sensitivities of input text/input fields to generate training and/or test data for machine learning applications. For example, machine learning logic may be executed to train a model or network using the sensitivity data, and be further refined to iteratively update and/or re-train the model or network based on user feedback to enhance an accuracy of future corrections. In another use case, the autocorrect learning system may use its mechanisms to learn appropriate corrections for assistant-based solutions (e.g., IBM™ Watson Assistant™), such as creating custom error correction to text input that takes into account recently seen entities. An example may be using an acronym transformer to generate acronyms of such recently seen entities (e.g., Distinguished Engineer as DE). In a further use case, the autocorrect learning system may be applied to an AI-based advisor, such as IBM™ Application Containerization Advisor, which is a knowledge graph-based solution. For example, input text thereto may include such terms as (or text that is corrected to) "database=Red Hat hibernate3 3" or "database=Red Hat, hibernate3 3". The autocorrect learning system, in this instance, may use different transformers to, for example, test commas between terms, delete terms, etc.

In knowledge graph databases, stored information is represented by means of a knowledge graph which has nodes interconnected by edges. Nodes of the graph represent entities for which entity data, characterizing those entities, is stored in the database. Entities may, for example, correspond to people, companies, devices, etc. More generally, nodes may represent any entity (real or abstract) for which information needs to be stored. The entity data stored for a node may comprise one or more data items, often called "properties" or "property values", describing particular features of an entity. Edges of the graph represent relationships between entities. An edge connecting two nodes of the graph represents some defined relationship which is applicable to the entities represented by those nodes. A graph may accommodate different relationships between entities, with each edge having a specified type, indicated by an edge name or "label", signifying the particular relationship represented by that edge. Nodes may also have associated names, or labels, to indicate different types or categories of node corresponding to different entity-types represented in the graph.

Knowledge graphs provide highly efficient structures for representing large volumes of diverse information about interrelated entities. Querying a knowledge graph database involves formulating a query request defining the information needed from the database in such a way that relevant nodes, edges, and properties can be identified, and then following edges in the graph to identify and extract the required data from storage. Hence, as described above, these queries must be formed with correct syntactic language, which the autocorrect learning system may identify (e.g., via the addition or deletion of commas, deleting terms, etc.) and correct. Knowledge graphs can be conveniently represented using matrices in which non-zero entries signify edges and row and column indices correspond to node identities. The process of identifying and extracting data for a query request can be implemented by performing mathematical operations on such matrices.

For knowledge graph-based solutions, the autocorrect learning system described herein may use feedback learning (or reinforced learning) to identify what combinations of transformers need be applied to a given text based on applying different combinations of the transformers to the text and observing the changes in AI response when given the varied transformed inputs. That is, in some embodiments, input text may be modified by a combination of transformers, and the knowledge graph-based AI system may generate different outputs depending on the input text. The difference in output is evaluated (or analyzed) to reason about behavioral characteristics of the underlying knowledge graph-based AI system with respect to, for example, an input sensitivity of terms, entity representation, knowledge graph scope, unknowns or unknown entities, etc. Based on the observed characteristics of the transformed text, the particular knowledge graph may be classified as being sensitive to particular issues, such as unknown entity or incorrect mappings due to domain variance.

Different outcomes might be observed depending on whether the input text is referencing an unknown entity (e.g., a situation where no matter how many transformations are applied to the input text, no results are returned) or an issue exists with a mismatch between the input text domain and the underlying knowledge graph domain. For example, an input of "SNMP" may be matched to Simple Network Management Protocol in an information technology (IT) domain in the knowledge graph, while the input text should be mapped to the to the SNMP chemical manufacturing process which is in a chemical domain non-existent in the knowledge graph.

Depending on the analysis of the transformed text, the transformed input may automatically (and in future iterations) adjust and cope with the input sensitivity and entity representation at a syntactic level of the given knowledge graph. Here, entities not correctly mapped to the knowledge graph concepts and unknowns may be flagged for user input. Using the aforementioned example, an input entity such as SNMP may have a valid knowledge graph mapping (to the IT domain) but may still be flagged as an error for user review due to the domain variance between the chemical domain and the IT domain based on the context of the input.

Figure 4:
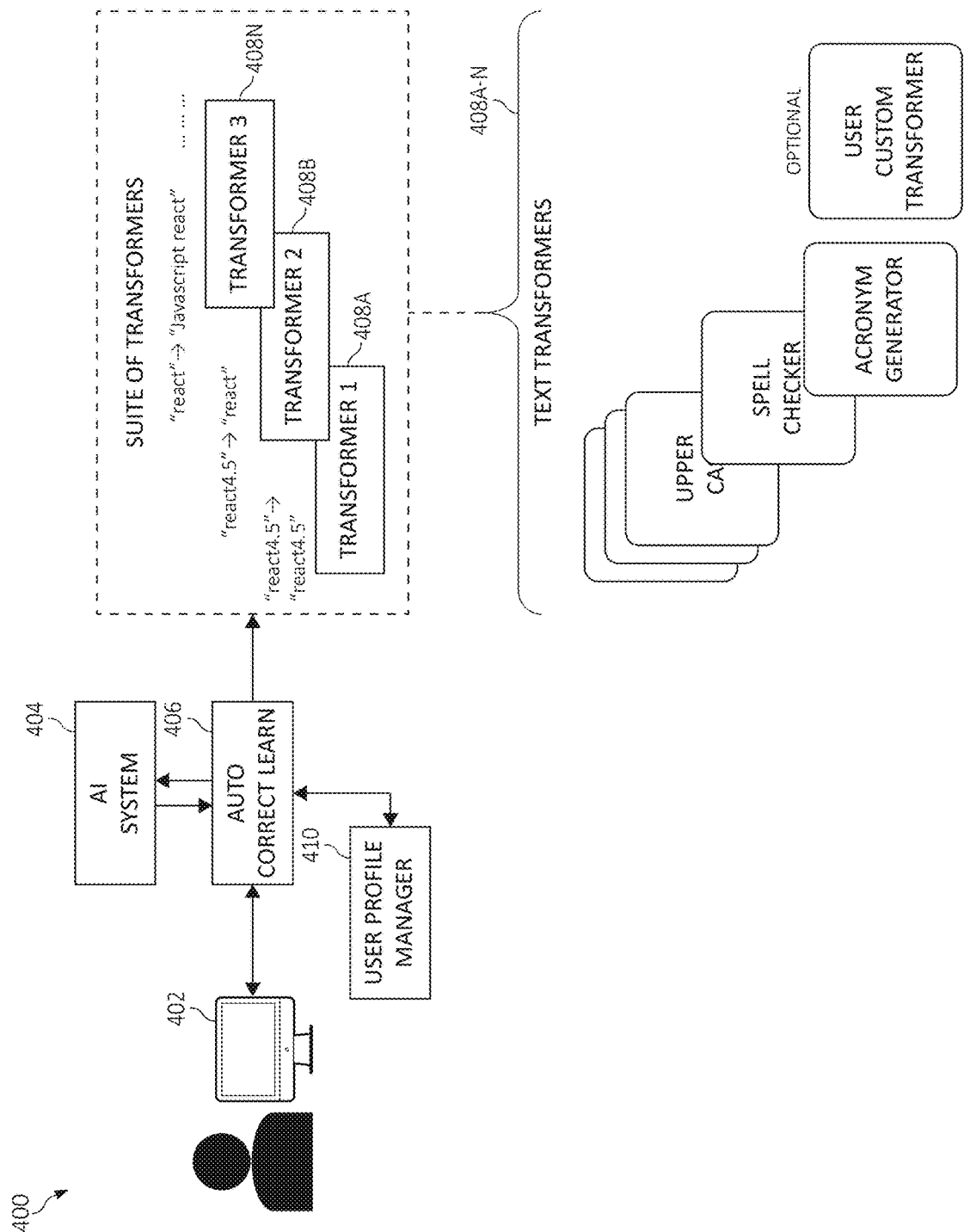
FIG. 4 is a block diagrams depicting functional components of an autocorrect learning component of an AI system, according to an embodiment of the present invention.

Referencing now FIG. 4, illustration 400 depicts the functional components of the autocorrect learning system. The autocorrect learning system may include a user entering text into an application on a computing device 402, such as (or a "target system") which is in communication with the AI system 404 (e.g., which may be executed on computer system/server 12) by way of an autocorrect learning component 406. The autocorrect learning component 406, executing on the AI system, may include a library containing a plurality of transformers 408A-N and maintain a user profile manager 410.

In some embodiments, each transformer 408A-N may comprise a standalone component that receives textual input, performs a given transformation on the textual input, and return the transformed text to the target system in the form of a proposed correction that the user may select and/or by simply automatically transforming the input text. As mentioned, the transformations for each respective transformer may include, without limitation, converting lower case text to capitalized text (or upper case text to lower case text), spell checking, entity validation, generating and/or disambiguating acronyms, testing or deleting commas and/or semicolons between words or items, adding and/or deleting terms, characters, and/or symbols, and the like. In addition, custom transformers of which the user defines their function may be optionally included in the library of transformers 408A-N, and/or implemented by way of a pointer to an application programming interface (API) that initializes the custom transformer.

In some embodiments, the user profile manager 410 may store and manage the autocorrect preferences unique to each user. That is, the user profile manager 410 may learn, over time (perhaps by way of machine learning with feedback re-training), which corrections the user has accepted and/or rejected to input text historically. The user profile manager 410 may implement a time-based reward-decay model in which recent preferences the user has specified are weighted more heavily when performing an autocorrect function than those preferences specified less recently.

Upon each query from the user, the user profile manager 410 may identify whether the user has specified a preference. Preferences, for example and without limitation, may include being presented a list of results versus a single result from the query (i.e., more results as opposed to fewer results), defined unique results, no errors, etc. In a case where the user does specify a preference(s), the preference is used to constrain the autocorrect process (i.e., the text processing operation) and the preference is stored in the user profile manager 410 for future use. If the user performing the query does not specify a preference, the autocorrect learning system will query the user profile manager 410 to determine whether the user has previously specified preference(s), and use the previous preference(s) to constrain the autocorrect process for the query and guide the transformer calls according to weight applied to each preference(s). In a case where the user specifies a different preference than that which is stored in the user profile manager 410 (e.g., requesting to be presented a list of results versus a single result from the query), this preference is stored in the user profile manager 410 according to the time-based reward-decay model (where this new preference is given heavier weight when considering the preference in future query iterations).

The autocorrect learning component 406, in association with the AI system 404, may for example initialize a machine learning operation to learn, extract, and infer contextual reasoning information of each database or knowledge base. That is, the autocorrect learning component 406, in association with the AI system 404, may understand, learn, and acquire knowledge (e.g., judgment reasoning knowledge), which then may be used, applied, and/or even inferred during the course of the autocorrect process.

It should be noted that autocorrect learning component 406 may be a machine learning component for training and learning one or more machine learning models and also for learning, applying inferences, and/or reasoning pertaining to one or more domains, concepts, features, problems and relationships between the domains, or a combination thereof to the machine learning model for the dialog manager 406. For example, the autocorrect learning component 406 may learn one or more preferences for variables in a selected domain, one or more preferences for one or more user interface elements for multiple domains, a modeling cost and cognitive load. The autocorrect learning component 406 may be used to uniquely autocorrect the input text based on the learning.

It should be noted, that in one embodiment, by way of example only, the autocorrect learning component 406 may perform the machine learning operation using various means. By way of example only, the autocorrect learning component 406 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting.

Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Naïve Brute Force Algorithm

In various embodiments, different algorithms or "approaches" in performing the autocorrect process may be utilized. In one embodiment, a naïve brute force algorithm may be implemented by the autocorrect learning component 406 executing on the AI system 404 when performing the text processing. In this approach, the autocorrect learning component 406 may receive a text input (or a collection of text inputs) via an API call from the target system 402. The autocorrect learning component 406 may additionally (or optionally) receive a desired outcome from the API, such as those constraints of user preferences discussed prior. The autocorrect learning component 406 may then, according to the constraint(s), execute a text processing operation to transform the input text into (corrected) transformed text by sequentially applying one or more of the text transformers 408A-N on the input text using a brute force method, and observe and analyze the results or "impact" on the text. Without limitation, the results may include whether (after each transformation) the transformed text generated an error message (or did not generate an error message), whether the transformed text increased or decreased the number of results to the query, etc.

The analysis may include identifying those of the transformers 408A-N which had no impact on the input text after transformation, and discarding these transformers. The analysis may further include identifying which of the transformers 408A-N, when applied, achieved the desired output specified by the user. If no desired outcome was specified by the user, the autocorrect learning component 406 may present a sample of listings of the observed impact the respective transformer 408A-N made to the query given the transformed text to elicit feedback from the user on desired outcomes such that the component learns what kinds of corrections the user would like to achieve.

Contextual Multiarmed Bandit (CMAB) Algorithm

In another strategy, the autocorrect learning component 406 may perform the autocorrect process using a contextual multiarmed bandit approach. An example may include performing the text processing and applying the transformers 408A-N to the input text according to a Linear Upper Confidence (LinUCB) algorithm, which is an online learning solution that choses, based on a given context (or side information), an action from a set of possible actions so as to maximize the total payoff (or reward) of the chosen actions. The reward thus depends on both the action chosen and the context associated with the action.

With respect to the autocorrect learning component 406, any combination of the text transformations being performed by transformers 408A-N can be considered the action, and existing side or context information regarding the text submission can be modeled as the context. For example, without limitation, the context may include such features as a text API identifier, containsUpperCase, containsLowerCase, containsSymbols, containsDigits, isAllDigits, isAllCharacters, containsWhiteSpace, inferredLanguague, inputLength, etc. Here, the response of the AI system 404 together with the user feedback can be considered as the reward/payoff in a CMAB setting of the algorithm. Again, the reward can be seen as achieving the desired output goal (e.g., constrained by user preference to include no error, more results, less results and a trade-off in the text similarity to initial input text (minimum change required).

In some instances, a textual input to the autocorrect learning component 406 may require multiple transformer 408A-N calls. For example, the text input may comprise a list with a missing comma (e.g., Red, Hat hibernate3 3; Red Hat, hibernate3 3; Red Hat hibernate3, 3). In these instances, one or more of the transformers 408A-N may need to be called multiple times to allow the transformer multiple trials prior to returning a result to the user, in the event of no change (or no reward). If no target goal is known, the autocorrect learning component 406 may perform a number of transformations on the input text seeking for impact on the response from the AI system 404. In these cases, the autocorrect learning component 406 continues until a predetermined budget has been exhausted to identify whether multiple changes to the input text may be observed (e.g., increase or decrease in results, error, no error). Once the autocorrect system has learnt what types of behavior the transformers 408A-N apply to the input text, a sampling of the impact each transformation had on the input text may be presented to the user, in order to elicit user feedback for desired behavior during future iterations.

Zero-Shot Learning (Zsl) Algorithm

In some scenarios, the possibility exists that none of the transformers 408A-N were able to be correctly applied to the input text. For example, an input of "WAS 9" may not yield any results for transformation, as this term may be unknown by the knowledge base. In this instance, without an appropriate named entity suggestion, the user may not be able to provide an appropriate label as feedback to the autocorrect learning component 406 because the transformers 408A-N may again not be applicable due to query constraints specified by the user. In such a situation, a ZSL approach may be applied.

Figure 5:
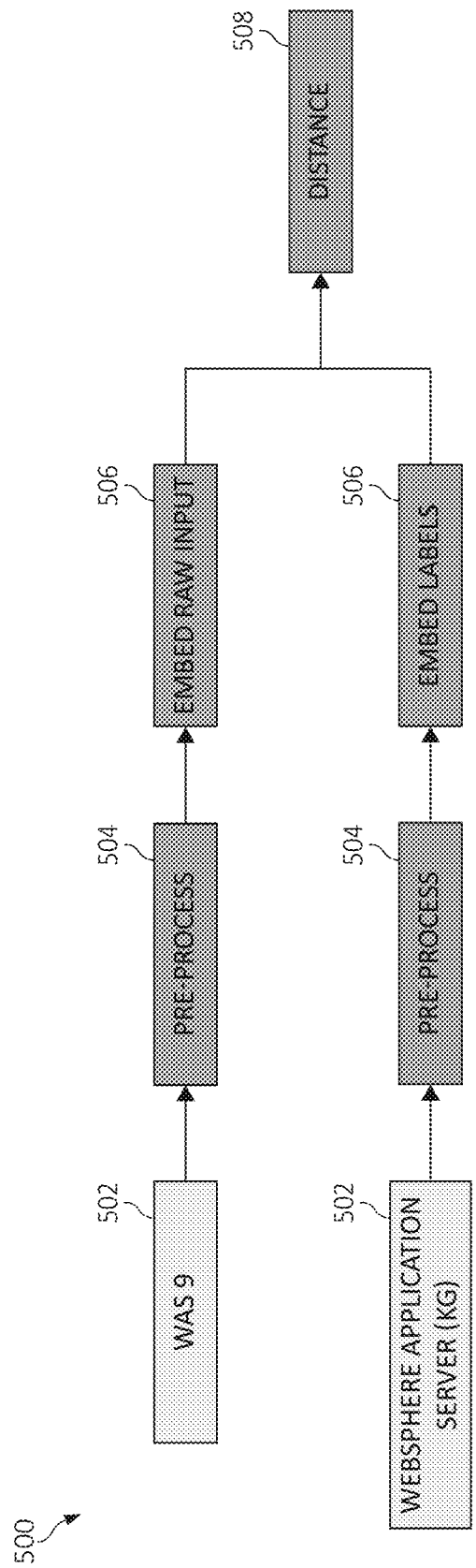
FIG. 5 is a block diagram depicting comparison stages of one algorithm implementing a text processing operation in the autocorrect learning system, according to an embodiment of the present invention.

Referring now to FIG. 5, illustration 500 depicts the ZSL process as correspondent to the mechanisms of the present invention. Referring to the text input of "WAS 9", the text input may be compared to a known label in the knowledge base, such as "Web Sphere Application server", as in block 502. In block 504, the autocorrect learning component 406 may pre-process the text and embed raw input of the text input and embed labels of the term from the knowledge domain in block 506 to generate a semantic distance, as in block 508. Upon determining the semantic distance, the autocorrect learning component 406 may determine an appropriate label for the input based on the closest possible distance to determine a relevant label for the unknown.

Figure 6:
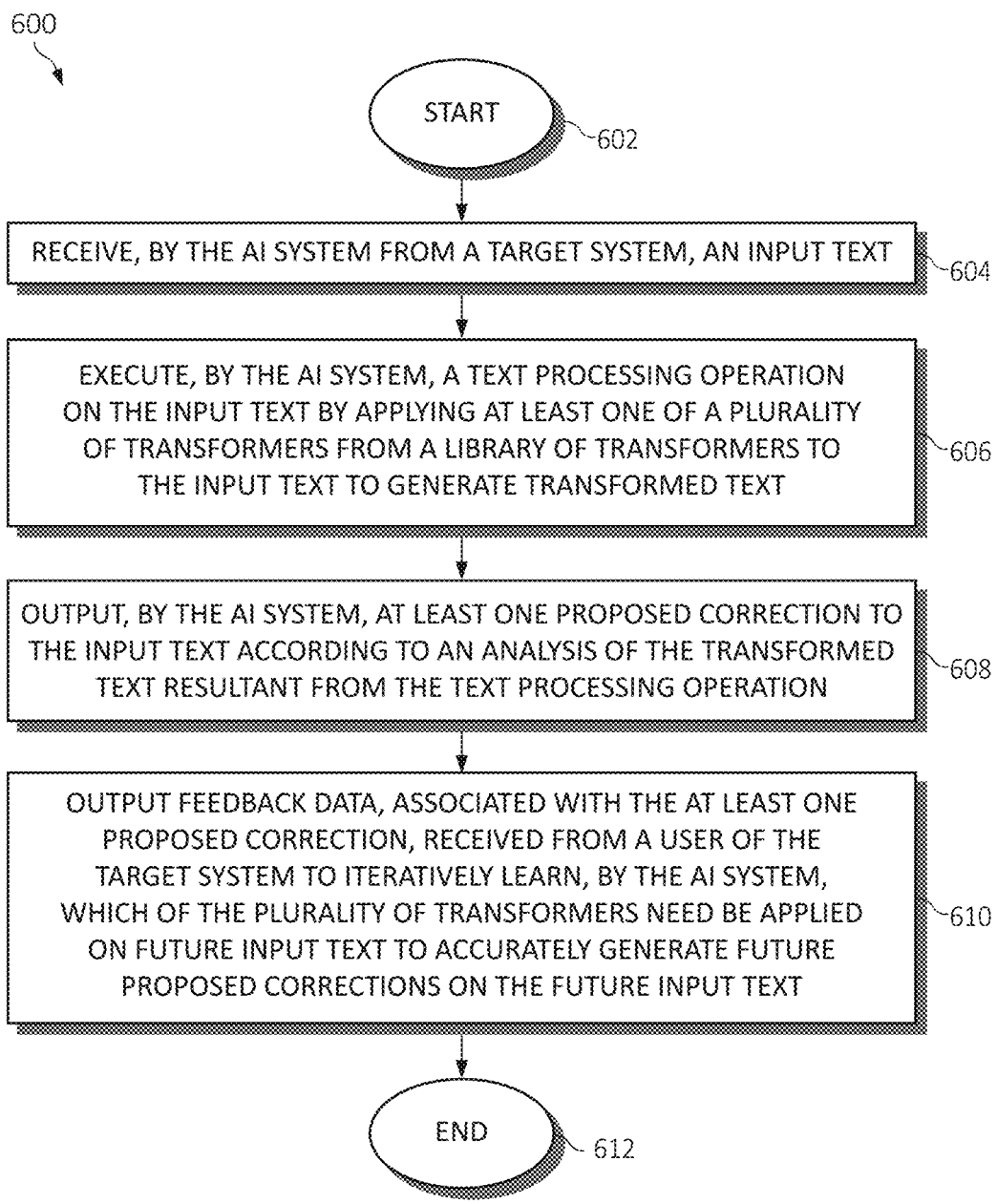
FIG. 6 is a flowchart diagram of an exemplary method for learning and correcting errors in text input fields to the AI system, according to an embodiment of the present invention.

Turning to FIG. 6, a flowchart diagram of an exemplary method 600 for learning and correcting errors in text input fields to an AI system is provided. The method 600 may be performed by, for example, the computer system/server 12 described in FIG. 1. The method 600 begins (step 602) by receiving, by the AI system from a target system, an input text (step 604). The AI system executes a text processing operation on the input text by applying at least one transformer from a library of transformers to the input text to generate transformed text (step 606). At least one proposed correction to the input text is output by the AI system based on an analysis of the transformed text (step 608). Feedback data, associated with the at least one proposed correction, is subsequently received from a user of the target system to iteratively learn, by the AI system, which of the transformers need be applied on future input text to accurately generate future proposed corrections on the future input text (step 610). The method 600 ends (step 612).

In conjunction with the method 600, each of the plurality of transformers are a standalone component which receive the input text and output the transformed text, each of the plurality of transformers perform a different syntactic transformation on the input text to generate the transformed text, and at least one of the plurality of transformers in the library of transformers is a user-defined custom transformer or a pointer to an API that implements the user-defined custom transformer.

In conjunction with the method 600, at least one user criterion constraining the text processing operation to a desired outcome is received, and the analysis of the transformed text includes generating the at least one proposed correction to the input text according to the at least one user criterion.

In conjunction with the method 600, a profile manager is maintained by the AI system, which contains preferences of the user, where the at least one user criterion is stored as one of the preferences in the profile manager.

In conjunction with the method 600, the AI system further includes a knowledge graph, and performing the text processing operation further includes comparing the input text to information in the knowledge graph to generate the transformed text.

In conjunction with the method 600, the text processing operation operates as at least one of a naïve brute force algorithm, a contextual multiarmed bandit (CMAB) algorithm, and a zero-shot learning (ZSL) algorithm.

In conjunction with the method 600, the text processing operation is initialized by an API call to the AI system from each one of a plurality of applications executing on the target system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method for learning and correcting errors in text input fields to an artificial intelligence (AI) system, the computer-implemented method, comprising:
   receiving, by the AI system from a target system, an input text;
   executing, by the AI system, a text processing operation on the input text by applying at least one of a plurality of transformers from a library of transformers to the input text to generate transformed text;
   outputting, by the AI system, at least one proposed correction to the input text according to an analysis of the transformed text resultant from the text processing operation; and
   using feedback data, associated with the at least one proposed correction, received from a user of the target system to iteratively learn, by the AI system, which of the plurality of transformers need be applied on future input text to accurately generate future proposed corrections on the future input text.

2. The computer-implemented method of claim 1, wherein:
   each of the plurality of transformers are a standalone component which receive the input text and output the transformed text;
   each of the plurality of transformers perform a different syntactic transformation on the input text to generate the transformed text; and
   at least one of the plurality of transformers in the library of transformers is a user-defined custom transformer or a pointer to an application programming interface (API) that implements the user-defined custom transformer.

3. The computer-implemented method of claim 1, further comprising receiving at least one user criterion constraining the text processing operation to a desired outcome, wherein the analysis of the transformed text includes generating the at least one proposed correction to the input text according to the at least one user criterion.

4. The computer-implemented method of claim 3, further comprising maintaining, by the AI system, a profile manager containing preferences of the user, wherein the at least one user criterion is stored as one of the preferences in the profile manager.

5. The computer-implemented method of claim 1, wherein the AI system further includes a knowledge graph, and wherein performing the text processing operation further includes comparing the input text to information in the knowledge graph to generate the transformed text.

6. The computer-implemented method of claim 1, wherein the text processing operation operates as at least one of a naïve brute force algorithm, a contextual multiarmed bandit (CMAB) algorithm, and a zero-shot learning (ZSL) algorithm.

7. The computer-implemented method of claim 1, wherein the text processing operation is initialized by an application programming interface (API) call to the AI system from each one of a plurality of applications executing on the target system.

8. A system for learning and correcting errors in text input fields to an artificial intelligence (AI) system, the system comprising:
   a hardware memory; and
   a hardware processor executing instructions stored in the hardware memory; wherein, when executed, the instructions cause the hardware processor to:
      receive, by the AI system from a target system, an input text;
      execute, by the AI system, a text processing operation on the input text by applying at least one of a plurality of transformers from a library of transformers to the input text to generate transformed text;
      output, by the AI system, at least one proposed correction to the input text according to an analysis of the transformed text resultant from the text processing operation; and
      use feedback data, associated with the at least one proposed correction, received from a user of the target system to iteratively learn, by the AI system, which of the plurality of transformers need be applied on future input text to accurately generate future proposed corrections on the future input text.

9. The system of claim 8, wherein:
   each of the plurality of transformers are a standalone component which receive the input text and output the transformed text;
   each of the plurality of transformers perform a different syntactic transformation on the input text to generate the transformed text; and
   at least one of the plurality of transformers in the library of transformers is a user-defined custom transformer or a pointer to an application programming interface (API) that implements the user-defined custom transformer.

10. The system of claim 8, wherein, when executed, the instructions further cause the hardware processor to receive at least one user criterion constraining the text processing operation to a desired outcome, wherein the analysis of the transformed text includes generating the at least one proposed correction to the input text according to the at least one user criterion.

11. The system of claim 10, wherein, when executed, the instructions further cause the hardware processor to maintain, by the AI system, a profile manager containing preferences of the user, wherein the at least one user criterion is stored as one of the preferences in the profile manager.

12. The system of claim 8, wherein the AI system further includes a knowledge graph, and wherein performing the text processing operation further includes comparing the input text to information in the knowledge graph to generate the transformed text.

13. The system of claim 8, wherein the text processing operation operates as at least one of a naïve brute force algorithm, a contextual multiarmed bandit (CMAB) algorithm, and a zero-shot learning (ZSL) algorithm.

14. The system of claim 8, wherein the text processing operation is initialized by an application programming interface (API) call to the AI system from each one of a plurality of applications executing on the target system.

15. A computer program product for learning and correcting errors in text input fields to an artificial intelligence (AI) system, the computer program product comprising a non-transitory computer-readable storage medium having program instructions embodied thereon, the program instructions executable by a processor to cause the processor to:
receive, by the AI system from a target system, an input text;
execute, by the AI system, a text processing operation on the input text by applying at least one of a plurality of transformers from a library of transformers to the input text to generate transformed text;
output, by the AI system, at least one proposed correction to the input text according to an analysis of the transformed text resultant from the text processing operation; and
use feedback data, associated with the at least one proposed correction, received from a user of the target system to iteratively learn, by the AI system, which of the plurality of transformers need be applied on future input text to accurately generate future proposed corrections on the future input text.

16. The computer program product of claim 15, wherein:
each of the plurality of transformers are a standalone component which receive the input text and output the transformed text;
each of the plurality of transformers perform a different syntactic transformation on the input text to generate the transformed text; and
at least one of the plurality of transformers in the library of transformers is a user-defined custom transformer or a pointer to an application programming interface (API) that implements the user-defined custom transformer.

17. The computer program product of claim 15, wherein the program instructions executable by the processor further cause the processor to receive at least one user criterion constraining the text processing operation to a desired outcome, wherein the analysis of the transformed text includes generating the at least one proposed correction to the input text according to the at least one user criterion.

18. The computer program product of claim 17, wherein the program instructions executable by the processor further cause the processor to maintain, by the AI system, a profile manager containing preferences of the user, wherein the at least one user criterion is stored as one of the preferences in the profile manager.

19. The computer program product of claim 15, wherein the AI system further includes a knowledge graph, and wherein performing the text processing operation further includes comparing the input text to information in the knowledge graph to generate the transformed text.

20. The computer program product of claim 15, wherein:
the text processing operation operates as at least one of a naïve brute force algorithm, a contextual multiarmed bandit (CMAB) algorithm, and a zero-shot learning (ZSL) algorithm; and
the text processing operation is initialized by an application programming interface (API) call to the AI system from each one of a plurality of applications executing on the target system.

* * * * *